Figure 1:
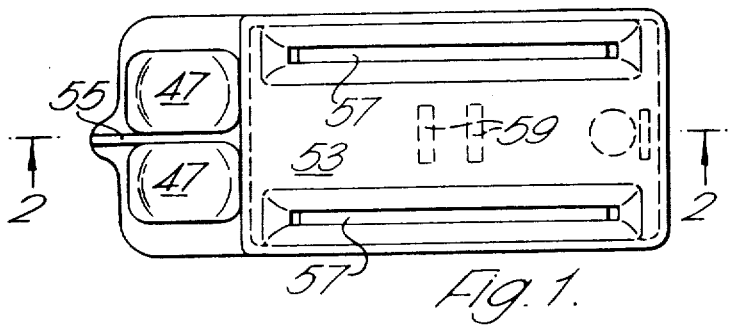

United States Patent

Burleigh

[15] 3,673,645
[45] July 4, 1972

[54] SAFETY BELT ANCHORAGE

[72] Inventor: David William Burleigh, Yately, England
[73] Assignee: Britax (London) Limited, Byfleet, Surrey, England
[22] Filed: June 4, 1970
[21] Appl. No.: 43,439

[52] U.S. Cl. .......................... 24/203, 24/230 A, 24/205.17
[51] Int. Cl. .......................................................... A44b 11/26
[58] Field of Search ........ 24/230 A, 205.17, 230 AV, 230 AS

[56] References Cited

UNITED STATES PATENTS

| 3,321,817 | 5/1967 | Smith | 24/230 A |
| 3,522,636 | 8/1970 | Klink | 24/205.17 |
| 1,466,975 | 9/1923 | Toelcke | 24/230 A |
| 3,168,770 | 2/1965 | John | 24/230 AS |
| 3,396,437 | 8/1968 | Burleigh | 24/230 A |

FOREIGN PATENTS OR APPLICATIONS

| 96,026 | 9/1922 | Switzerland | 24/230 AS |

*Primary Examiner*—Bernard A. Gelak
*Attorney*—Baldwin, Wight, & Brown

[57] ABSTRACT

A double anchorage for securing a pair of safety straps, said anchorage being adapted to be secured to a vehicle frame or to an equivilently strong support point between a pair of adjacent passenger seats, said anchorage comprising a pair of latch plates pivotally mounted within a single housing, means biasing said latch plates apart and towards respective side walls of the housing, the face of each latch plate facing a housing side wall being provided with a latching surface adapted to engage with a belt tongue when the latter is inserted between the latch plate and the respective side wall of the housing.

13 Claims, 4 Drawing Figures

PATENTED JUL 4 1972 3,673,645

SHEET 1 OF 2

Inventor
David William Burleigh
BY Baldwin Wight Diller & Brown
Attorneys

SAFETY BELT ANCHORAGE

This invention relates to a safety belt anchorage of the type adapted to be connected to the frame of a motor vehicle or to a similar sufficiently strong mounting point between two adjacent passenger seats in a vehicle. The anchorage is designed as a double anchorage for securing two safety straps which may either be of the single diagonal or lap strap type or of the lap and diagonal strap type, one end of the strap being secured either directly to the vehicle's frame or to an inertia operated device secured to the vehicle frame. With such double anchorages, the safety strap which comprises a length of webbing, or two lengths of webbing terminating in a buckle tongue is adapted to be placed across the body of the occupant of the seat and the buckle tongue is then inserted into the anchorage, thereby maintaining the user in his seat, for example in the event of the vehicle being involved in an accident.

According to the present invention, we provide a double anchorage for securing a pair of safety straps, said anchorage being adapted to be secured to a vehicle frame or to an equivilently strong support point between a pair of adjacent passenger seats, said anchorage comprising a pair of latch plates pivotally mounted within a single housing, means biasing said latch plates apart and towards respective side walls of the housing, the face of each latch plate facing a housing side wall being provided with a latching surface adapted to engage with a belt tongue when the latter is inserted between the latch plate and the respective side wall of the housing, and a release mechanism for each latch plate to pivot the latch plate away from its respective side wall.

According to a particular embodiment of this invention, the anchorage comprises a pair of latch plates housed within a single housing, each latch plate being mounted for pivotal movement within the housing and being located within the housing by a pair of abutment shoulders fast with a side wall of the housing, said abutment shoulders being arranged to engage with projections provided on the side edges of the latch plate and each of said latch plates being provided with a latching surface for latching engagement of a belt tongue adapted for insertion between the latch plate and its respective side wall, means normally biasing each of said latch plates to urge their latching surface towards their respective housing side walls, each latch plate being provided with a tail and means acting on the tail for pivoting the latch plate to move the latching surface away from the respective side wall of the housing.

Preferably an abutment post is provided on each side wall of the housing to co-operate with one of the pair of abutment shoulders fast with each side wall to assist in locating the latch plate in position. Each abutment shoulder may be integral with a tongue locating lug and the two may be stamped out of the respective wall of the housing.

Preferably the side walls of the housing are extended downwardly and each is provided with an aperture in the extended part through which a common fixing bolt may be secured.

The housing may be substantially rectangular in cross section and one of the end walls may be provided with an inturned lug to which may be pivotally connected a pair of release levers each of which is provided with a cam surface arranged to engage with the tail of a respective latch plate, each of said release levers extending from its pivot point across the housing and projecting outwardly beyond the opposite end wall of the housing and each being formed at its end remote from its pivot point so that it may be manually operated.

Figure 2:
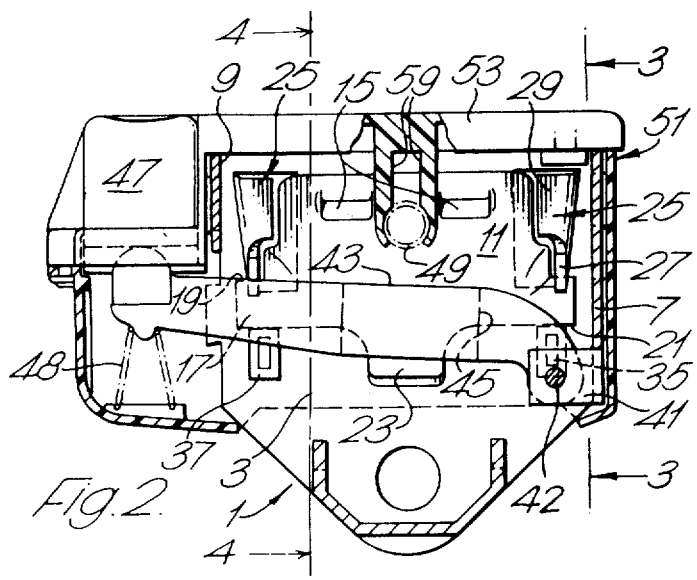
Figure 3:
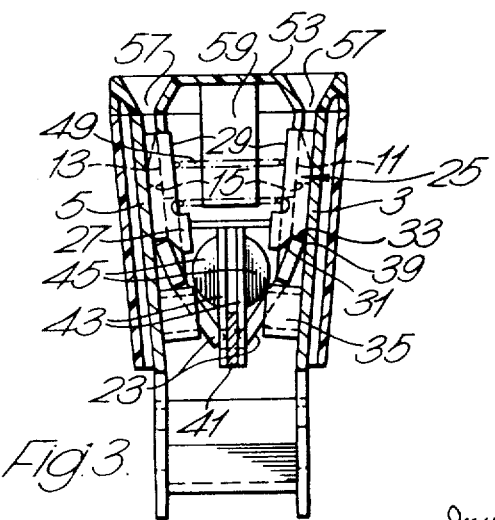
Figure 4:
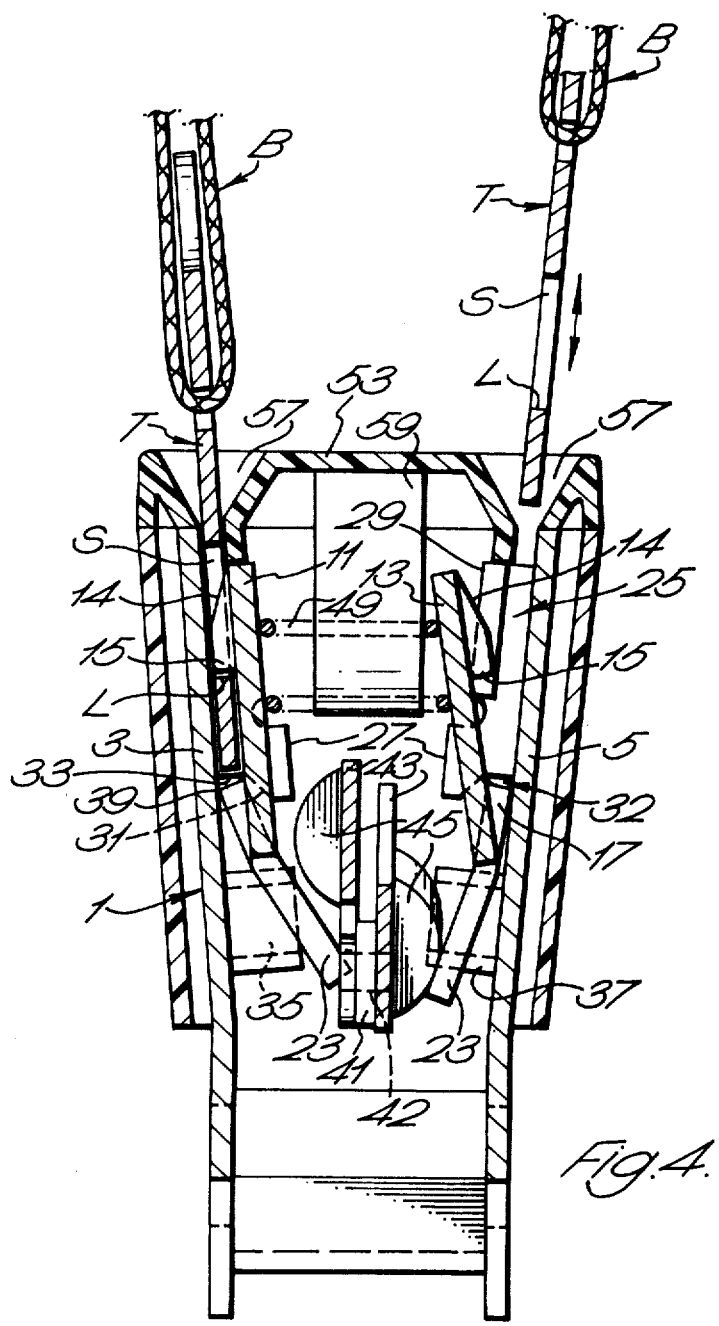

A preferred embodiment of the invention is now described with reference to the accompanying drawings, in which:

FIG. 1 is a plan view of a double belt anchorage,
FIG. 2 is a section on the line 2 — 2 of FIG. 1,
FIG. 3 is a section on the line 3—3 of FIG. 2, and
FIG. 4 is a section on the line 4 — 4 of FIG. 2, showing one belt tongue and associated mechanisms in the released position and the other in a latched position.

Referring to the drawings, the double belt anchorage has a housing 1 of substantially rectangular cross section made up of a pair of side walls 3 and 5 connected together by a pair of opposite parallel spaced end walls 7 and 9. The end walls 7 and 9 are located in position on projecting tongues provided on the end edges of the side walls 3 and 5. As can be seen from FIG. 3, the ends of the housing taper inwardly towards the bottom of the housing 1.

A pair of latch plates 11 and 13 are located within the housing 1 with each latch plate being pivotally mounted on a side wall 3 or 5. Each latch plate 11, 13 is identical and each is pivotally mounted on its respective side wall in an identical manner, and hence, only the latch plate 11 will be described in detail.

The latch plate 11 has a pair of belt tongue latching surfaces 15 on the face of the plate facing the side wall 3 with each surface 15 being defined by the innermost face of an indentation stamped in the plate 11. The latch plate 11 is formed along its side edges with a projection 17, the forward facing edge of each of which provides a load bearing shoulder 19 and the rear facing or lower edge of which provides a locating shoulder 21 to prevent the latch plate 11 being separated from its side wall 3, as will hereinafter be explained. A tail 23 is provided centrally at the rear edge of the latch plate 11, which is inclined upwardly away from the latching surface of the latch plate 11 and away from the adjacent side wall 13.

The side wall 3 of the anchorage housing has two upstanding projections 25 formed integral therewith, adjacent each of its side edges, the said projections 25 being stamped out of the side wall so that a first portion 27 lies normal to the side wall and a second portion is turned over inwardly to lie parallel to the side wall so as to provide a tongue locating lug 29 (FIG. 2) which together with the other lug 29 and the plate itself, defines a throat into which a buckle tongue T (FIG. 4) may be inserted. The first upstanding portion 27 is suitably shaped on its lower face to define a locating notch 32 at its rear edge having an inclined wall 31 merging with a wall portion or shoulder 33 normal to the surface of the side wall 3 and of a depth substantially the same as the thickness of the material of the latch plate 11, so as to provide an abutment shoulder 33. This notch 32 is arranged to receive the projection 17 on one side of the latch plate 11, with the load bearing shoulder 19 abutting against the abutment shoulder 33 and thereby locating the latch plate within the housing and preventing it from moving either outwardly of the housing or away from the side wall 3. Two abutment posts 35 upstand from the side wall 3, each in line with the projections 25, and behind the projections 17 on the latch plate, and once the latch plate has been located in position with its load bearing shoulder 19 engaging the abutment shoulder 33 a sleeve 37 of plastic or other material forming a friction fit is pushed onto each of the posts 35, so that the sleeve engages the locating shoulder 21 on each of the projections 17 and thereby prevents the latch plate 11 from being separated from the side wall 3.

Each of the projections 17 is deformed out of the plane of the latch plate 11, as can be seen from FIG. 3, so that the edge of the load bearing shoulder 19 adjacent the side wall 3 provides a fulcrum 39 on the face of the latch plate facing the side wall, about which fulcrum 39 the latch plate can pivot. It will be appreciated that this pivoting action is brought about by application of pressure to the tail 23 of the latch plate.

The end wall 7, adjacent its inner or rearmost end, is formed with an inturned lug 41 to which is pivotally connected a pair of release levers 43. Each release lever 43 is provided substantially mid-way between its ends with a cam 45 arranged to bear against the inwardly facing surface of the tail 23, and the end of each release lever 43 remote from its pivot point projects outwardly beyond the end wall 9 and is suitably formed so that manual release means, such as a press-button 47 can be secured thereto.

Under normal conditions, each of the latch plates 11 and 13 occupies the position shown in FIG. 3, and they are biased to this position by a coil spring 49 arranged between the two latch plates. At the same time, the release levers 43 occupy the position shown in FIGS. 1 through 3 at the left-hand side of FIG. 4 of the drawings with the cams 45 spaced slightly from the tails 23 so as not to inhibit closing of the latch plates 11.

The anchorage housing 1 is contained within an outer casing 51 preferably made of plastics material. The casing 51 is suitably formed, as can be seen particularly in FIGS. 1 and 2 to encompass the manually operable release means 47 and the ends of the release levers 43 projecting out of the housing 1 and it is arranged to be secured to the casing 1 for example, by means of grub screws. As can be seen from FIG. 2, a coil spring 48 is located between the free end of each release lever 43 and the housing 51, to bias the levers to a rest position. Referring to FIG. 1, a cover plate 53 overlies the entry end of the anchorage housing and is provided with a web 55 to separate the two manual release means 47 and with two tapered entry slots 57 each arranged to merge with one of the throats into which the belt tongues may be inserted.

Two fingers 59 depend from the inner surface of the housing 53 between the slots 57, and the free ends of these fingers 59 are suitably formed to embrace the spring 49 and positively locate it between the latch plates 11 and 13.

Each of the side walls 3 and 5 of the housing is extended at its lower or innermost end to provide mounting points for a bolt and a spacer sleeve. This bolt can then be used to secure the anchorage to a suitable mounting point on the frame-work of a vehicle between a pair of adjacent passenger seats or to a suitably strengthened mounting point on the vehicle transmission tunnel or other suitable member, with each of the manual release means 47 preferably facing forwardly within easy reach of a passenger occupying the seat, and the slots 57 presented upwardly to receive a belt tongue.

When the passenger gets into the vehicle and wishes to secure his safety belt B, he will take hold of the belt tongue T, which will be secured to the free end of either a lap or a diagonal safety belt strap B secured to the vehicle frame on the other side of the seat, or alternatively mounted on a combined lap and diagonal strap mounted on the vehicle in known manner, pull the belt across his body, and will insert the belt tongue T into the entry slot 57 nearest his seat moving it from the position shown on the right-hand side of FIG. 4 to the position shown on the left-hand side of this same figure. It will of course be appreciated that the safety belt strap may be either of the so called "static" or of the so called "inertia" type. The belt tongue is automatically guided by the entry slot 57 into the throat referred to above, and hence, between a latch plate 11 or 13 and a side wall of the housing, and the leading edge of the belt tongue T will engage the inclined leading surface 14 of each of the indentations providing the latching surfaces 15, and upon application of gentle pressure to the tongue toward the vehicle floor into the housing, the latch plate 11 or 13 will be moved against the bias of the spring 49 to the position of the latch plate 13 in FIG. 4 until a slot S provided in the belt tongue and having a latching surface thereon moves into registry with the two indentations whereupon the coil spring 49 will move the latching plate from the position occupied by the plate 13 in FIG. 4 to the corresponding position occupied by the plate 11 in FIG. 4 in which position the latching surface 15 engages with the latching surface L on the tongue T. The tongue will now be firmly locked in position within the double anchorage.

When the user wishes to release the belt tongue from the anchorage, he applies pressure to the manual release means 47 nearest to him thereby causing the release lever 43 to pivot against the bias of the spring 48, whereupon the cam 45 will ride down the inwardly facing surface of the tail 23 thereby causing pivoting of the latch plate 11 about its fulcrums 39 and against the bias of the spring 49 to a position corresponding to that of the plate 13 in FIG. 4. This will move the latching surface 15 out of engagement with the latching surface on the tongue which can then be freely removed from the casing.

It will be appreciated that the anchorage can be used either for one belt or for two belts at a time, and if only one belt is being used, the belt tongue can be inserted into either entry slot 57. The fact that a belt tongue has not been inserted into the other entry slot 57 in no way prejudices the efficiency or safety aspect of the anchorage.

In a modification of the present invention the latch release mechanism is removed from the anchorage and each belt tongue is provided with and carries its own release mechanism. Thus each tongue would have a pivoted lever normally lying in the plane of the tongue so as to underlie the latch plate when the tongue is in engagement therewith. It will be appreciated that by pivoting the lever out of the plane of the tongue, the latch plate will disengage from the tongue freeing it for withdrawal from the housing. The release lever may be arranged to be pivoted manually by pressing on it with a finger or a slide plate may be provided having an appropriate cam surface engaging with the lever whereby when the slide plate is moved relative to the tongue, the lever is pivoted.

I claim:

1. A double anchorage for securing a pair of safety straps, the anchorage being rigidly connectible to a vehicle frame or to an equivalent strong support point between a pair of adjacent passenger seats and comprising a housing having a top wall, means defining a pair of spaced, noncoplanar belt tongue entry slots facing upwardly from said housing through said top wall, each said slot having a broad generally planar face with said faces opposing each other, a pair of latch plates pivotally mounted within said housing each adjacent one of two opposite side walls of said housing and movable toward and away therefrom, means biasing the latch plates apart and toward their respective adjacent side wall of the housing, a latch surface on the face of each latch plate facing its adjacent housing side wall, said latching surfaces being provided for engagement with a belt tongue when the latter is inserted through an entry slot and between a latch plate and the respective side wall of the housing, and manually operable latch plate release means adjacent each slot and said top wall for individually releasing said latch plates.

2. The double anchorage according to claim 1 wherein said manually operable latch plate release means include two press button release actuators, one for each latch plate adjacent each slot and said top wall.

3. The double anchorage according to claim 1 including a fixed dividing wall between said latch plate release means to prevent accidental operation of one of said latch plate release means when the other is operated.

4. The double anchorage according to claim 1 including for each latch plate a pair of abutment shoulders on the side wall of the housing adjacent the respective latch plate for locating the latch plate within the housing, each latch plate having projections for engaging with the respective abutment shoulders, a tail on each latch plate, and said release means including a separate member acting on each tail for pivoting the respective latch plate to move its latching surface away from the respective housing side wall to a belt tongue release position.

5. The double anchorage according to claim 4 wherein said manually operable latch plate release means includes a release lever associated with each latch plate, each lever having a medial portion extending across its associated latch plate interiorly of said housing, means mounting a free end of each lever for pivoting movement relative to the housing, opposite ends of each lever being exposed for manual operation to move the latch plates to unlatched positions thereof, and each tail being in alignment with an associated lever medial portion whereby upon operation of each lever the respective latch plate will move against said biasing means to a belt tongue releasing position.

6. The double anchorage according to claim 5 wherein an abutment post is provided on each side wall of said housing to cooperate with one of the pair of abutment shoulders on each side wall to assist in locating the latch plate in position.

7. The double anchorage according to claim 6 wherein a tongue locating lug is formed integrally with each abutment shoulder, and the two shoulders are stamped out of the respective wall of the housing.

8. An anchorage for securing thereto a belt tongue comprising a housing having a top wall, means defining a belt tongue entry slot facing upwardly from said housing to said top wall, a latch plate within said housing, means mounting said latch plate for pivotal movement toward and away from a side wall of said housing, means biasing said latch plate in a first direction, means for moving said latch plate in a second direction opposite said first direction with both said first and second directions being transverse to said side wall, said moving means including a lever having opposite end portions and a medial portion therebetween, a first of said lever end portions being pivotally mounted relative to said housing for movement of said other and medial portions toward and away from said top wall, said first and other lever end portions being at opposite ends of said housing, said other lever end portion being manually operable exteriorly of said housing for imparting pivoting movement to said lever, and coacting means between said medial lever portion and said latch plate for pivoting the latter against the force of said biasing means whereby said latch plate is moved to its unlatched position.

9. The anchorage as defined in claim 8 wherein said coacting means is a tail of said latch plate directed downwardly and away from said side wall.

10. The anchorage as defined in claim 8 wherein said coacting means is a cam surface at said lever medial portion for bearing against said latch plate upon manual pivoting movement of said lever.

11. The anchorage as defined in claim 8 including means for biasing said lever other end portion in a direction toward said top wall.

12. The anchorage as defined in claim 9 wherein said coacting means further includes a cam surface at said lever medial portion for bearing against said latch plate upon manual pivoting movement of said lever.

13. The anchorage as defined in claim 12 including means for biasing said lever other end portion in a direction toward said top wall.

* * * * *